United States Patent [19]

Brassert et al.

[11] Patent Number: 5,509,315

[45] Date of Patent: Apr. 23, 1996

[54] ABSORPTION DYNAMOMETER TORQUE MEASURING DEVICE AND CALIBRATION METHOD

[75] Inventors: Walter L. Brassert, Belmont; Paul N. Dahlstrand, Andover, both of Mass.

[73] Assignee: Northern Research & Engineering Corporation, Woburn, Mass.

[21] Appl. No.: 397,455

[22] Filed: Mar. 2, 1995

Related U.S. Application Data

[60] Division of Ser. No. 187,428, Jan. 26, 1994, Pat. No. 5,426,986, which is a continuation-in-part of Ser. No. 92,094, Jul. 15, 1993, Pat. No. 5,345,827.

[51] Int. Cl.⁶ ...................................... G01L 3/00
[52] U.S. Cl. ................... 73/862.09; 73/862.15; 73/1 C
[58] Field of Search ............... 73/1 C, 862.328, 73/862.329, 862.08, 862.09, 862.10, 862.11, 862.12, 862.13, 862.14, 862.15, 862.16, 862.17, 862.18

[56] References Cited

U.S. PATENT DOCUMENTS

| | | | |
|---|---|---|---|
| 3,548,649 | 12/1970 | Parkinson | 73/862.329 |
| 3,572,106 | 3/1971 | Jonas | 73/136 |
| 3,796,093 | 3/1974 | Parkinson | 73/136 A |
| 4,450,729 | 5/1984 | Troeder et al. | 73/862.34 |
| 4,488,443 | 12/1984 | Parkinson | 73/862.33 |
| 4,590,806 | 5/1986 | Lutton et al. | 73/862.34 |
| 4,682,505 | 7/1987 | Morissette et al. | 73/862.34 |
| 4,744,724 | 5/1988 | Brassert et al. | 415/158 |
| 4,899,596 | 2/1990 | Janik et al. | 73/862.33 |
| 4,947,035 | 8/1990 | Zook et al. | 250/225 |
| 5,228,349 | 7/1993 | Gee et al. | 73/862.336 |
| 5,345,827 | 9/1994 | Brassert et al. | 73/862.15 |

FOREIGN PATENT DOCUMENTS

| | | |
|---|---|---|
| 484421 | 9/1975 | U.S.S.R. |
| 644234 | 6/1948 | United Kingdom |
| 2133885 | 8/1984 | United Kingdom |

*Primary Examiner*—Richard Chilcot
*Assistant Examiner*—Ronald Biegel
*Attorney, Agent, or Firm*—Michael H. Minns

[57] ABSTRACT

The invention is an in-line torque meter for use with an absorption dynamometer in which the twist of a rotating shaft that transmits torque from an engine to an air dynamometer is measured by a single sensor on the adjacent stationary structure. The torque shaft is supported at the dynamometer end by a splined attachment to the shaft of the dynamometer and at the engine end in a pair of preloaded angular contact ball bearings. Torque from the engine causes the shaft to twist. Attached to and rotating with the shaft are two sleeves with projecting teeth, one sleeve attached at each end of the torque shaft. The projecting teeth are interleaved and are located so that both sets of teeth can be sensed by an adjacent single sensor. When the shaft is twisted by the applied torque, the teeth on the two sleeves are angularly displaced with respect to each other. This angular displacement is measured as a phase shift in the signal generated by the sensor. The phase shift being directly proportional to the applied torque. The torque sensor is moveable past the teeth when the torque shaft is stationary. The movement of the torque sensor generates a signal representative of the torque or twist in the torque shaft. If a predetermined torque is induced into the torque, then the movement of the torque sensor produces a signal representative of the torque induced in the torque shaft, thereby allowing a zero speed calibration check.

7 Claims, 5 Drawing Sheets

ABSORPTION DYNAMOMETER TORQUE MEASURING DEVICE AND CALIBRATION METHOD

This is a divisional of application Ser. No. 08/187,248, filed Jan. 26, 1994, now U.S. Pat. No. 5,426,986, which is a continuation-in-part of application Ser. No. 08/092,094, filed on Jul. 15, 1993, now U.S. Pat. No. 5,345,827.

BACKGROUND OF THE INVENTION

This invention pertains to absorption dynamometers, and in particular to a method of calibrating or checking the calibration of the torque measuring device.

Means of measuring torque generally fall into two categories: in-line (rotating) and reaction (stationary). Reaction torque measurements are used with air dynamometers, but they are inaccurate, being subject to errors introduced by aerodynamic effects associated with the exhaust of the engine being tested, the exhaust of the dynamometer, and local external air velocities. In-line torque measurements have also been used, but prior in-line torque meters have various drawbacks.

Most torque measuring systems require rotational movement of the measuring system to generate torque information. Because the measuring system must be rotating, it is difficult to calibrate or to check the calibration of the system once it has been installed. Frequently, calibration can only be performed under controlled conditions, such as in a testing laboratory.

The foregoing illustrates limitations known to exist in present dynamometer torque measuring devices and methods of checking the calibration of dynamometer torque measuring devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing in combination: a dynamometer; and a torque meter having a torsion shaft, one end of the shaft being coupled to the dynamometer; at least one first tooth projecting from a first location on the torsion shaft; at least one second tooth projecting from a second location on the torsion shaft, the first location being distal from the second location, the at least one first tooth being proximate the at least one second tooth whereby the teeth interleave, the angular distance between the at least one first tooth and the at least one second tooth varying as the torque in the torsion shaft changes; and a sensor positioned proximate the interleaved teeth, the sensor being moveable from a first position to a second position, when being moved from the first position to the second position the sensor moving past at least two interleaved teeth, the sensor producing an output signal in response to moving past said at least two interleaved teeth.

In a second aspect of the present invention, this is accomplished by providing a method for calibrating a torque sensing system, the torque sensing system including a torsion shaft, at least one first tooth projecting from a first location on the torsion shaft, at least one second tooth projecting from a second location on the torsion shaft, the first location being distal to the second location, the at least one first tooth being proximate the at least one second tooth whereby the teeth interleave, the angular distance between the at least one first tooth and the at least one second tooth varying as the torque in the torsion shaft changes, and a sensor positioned proximate the interleaved teeth, the method for calibrating comprising the steps: securing the torsion shaft in a fixed position; loading the torsion shaft to a predetermined torque; moving the sensor past at least two interleaved teeth, the sensor producing an output signal representative of the position of the at least two interleaved teeth, the distance between the interleaved teeth being representative of the torque in the torsion shaft.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
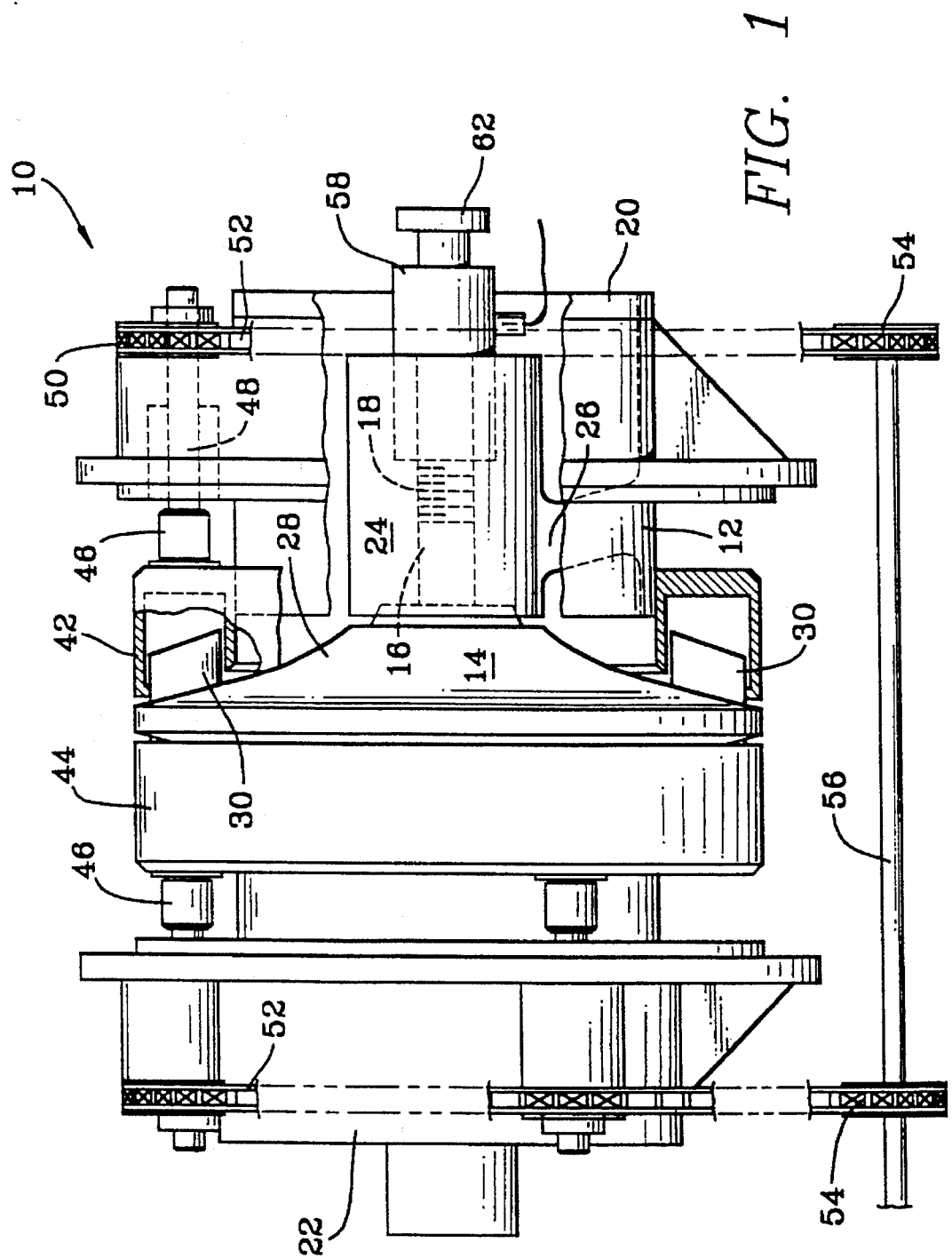
FIG. 1 is a side elevation view partly cross-sectioned, showing an absorption dynamometer and torque measurement system.
Figures 4, 4A:
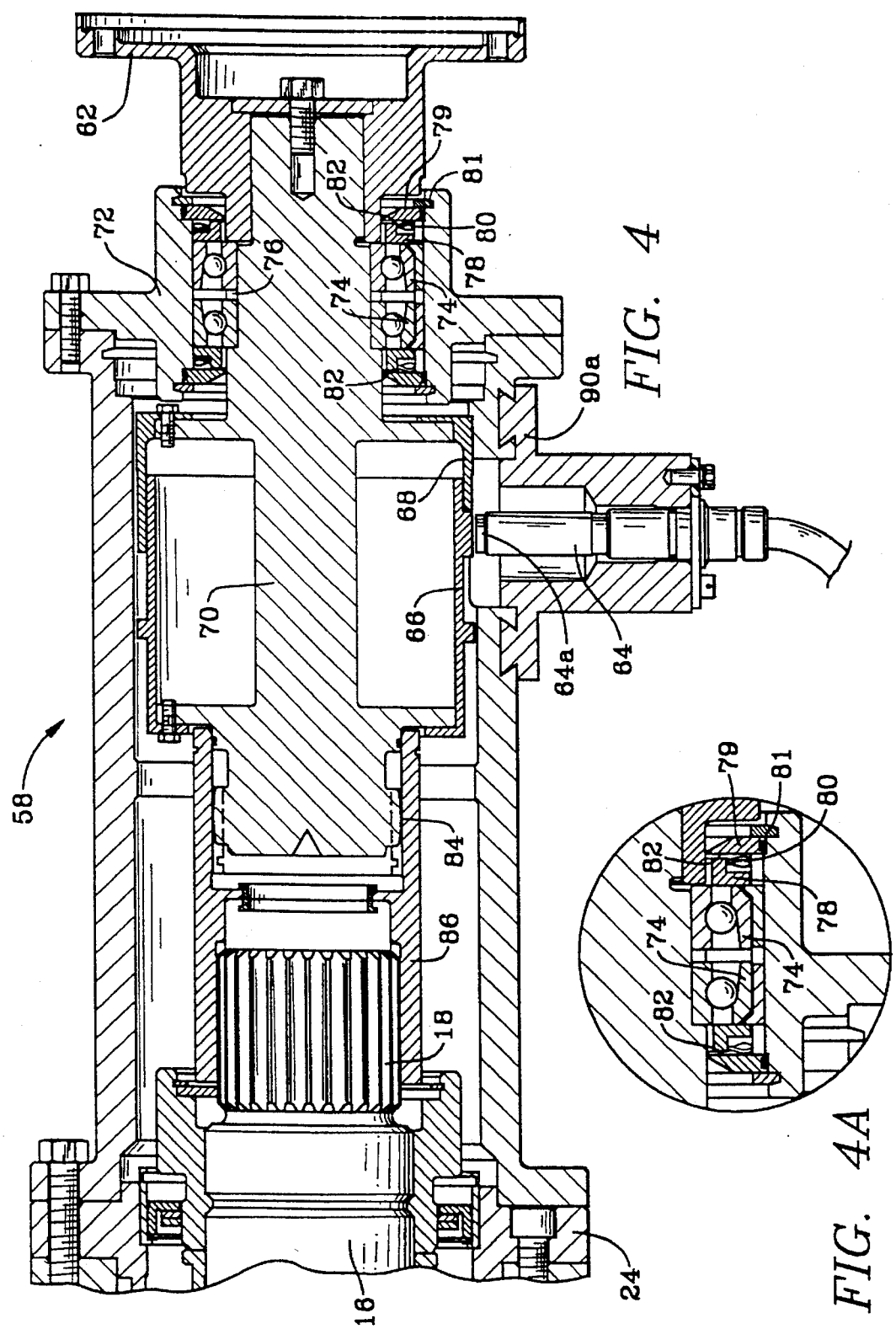
FIG. 4 is a side elevation in cross-section showing the details of an in-line torque measurement system.
FIG. 4A is an enlarged view of the bearings shown in FIG. 4.

The invention described below is an in-line torque meter for use with an air absorption dynamometer in which the twist of a rotating shaft that transmits torque from an engine to the dynamometer is measured by a single sensor on the adjacent stationary structure. Also described is a method for calibrating or checking the calibration of the torque meter at zero speed. A typical embodiment is shown in FIGS. 1 and 4. The torque shaft is supported at the dynamometer end by a splined attachment to the shaft of the dynamometer and at the engine end in a pair of preloaded angular contact ball bearings. Torque from the engine causes the shaft to twist. Attached to and rotating with the shaft are two sleeves with projecting teeth, one sleeve attached at each end of the torque shaft. The projecting teeth are interleaved and are located so that both sets of teeth can be viewed by an adjacent sensor. When the shaft is twisted by the applied torque, the teeth on the two sleeves are angularly displaced with respect to each other. This angular displacement is measured as a phase shift in the signal generated by the sensor. The phase shift being directly proportional to the applied torque.

This torque meter is built into the dynamometer structure. The torque meter is not disturbed when the engine is removed and replaced. It is therefore protected from damage in the process of engine attachment and removal.

The torque meter also uses a single sensor for measurement of phase displacement. This removes the dual sensor errors present in prior art torque meters, thereby improving the accuracy of torque measurement.

Figure 2:
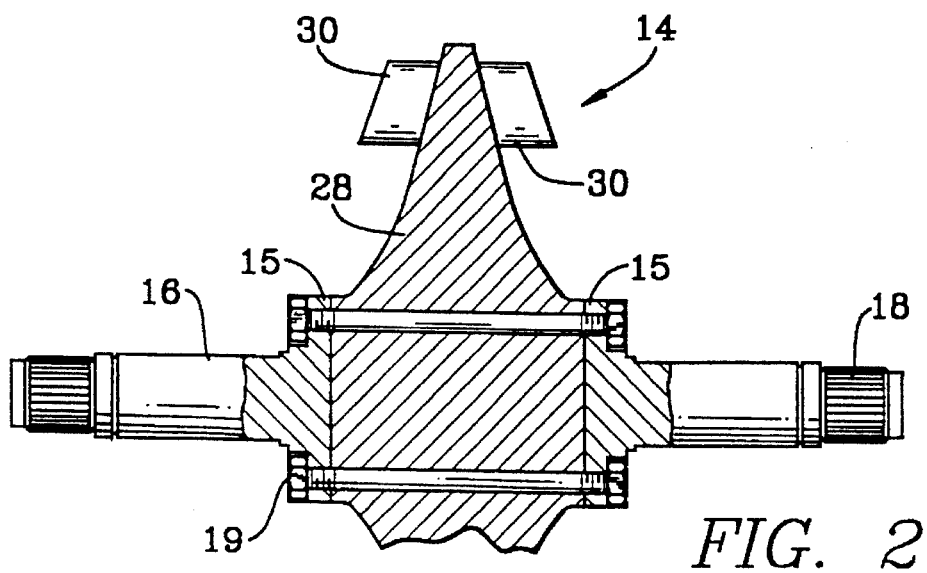
FIG. 2 is a partially cross-sectioned view of the major portion of the rotor shown in FIG. 1.
Figure 3:
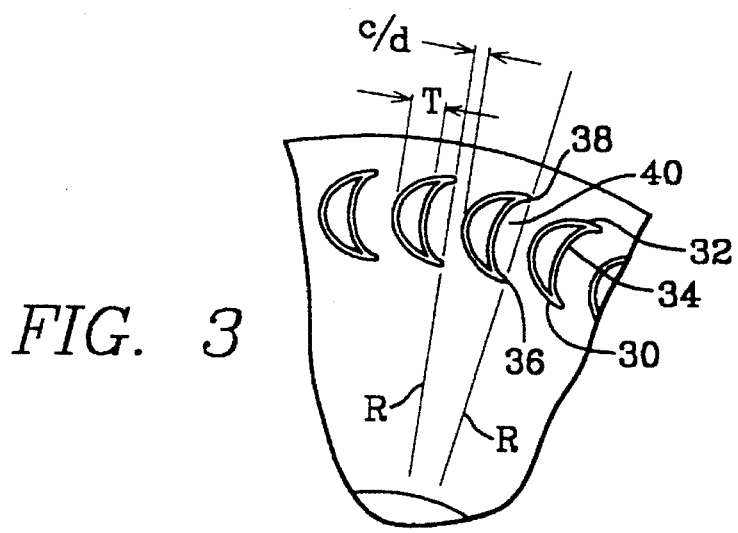
FIG. 3 is a fragmentary end view, taken from the left side of FIG. 2, of a portion of the rotor body showing some of the blades about the periphery thereof.

Although the torque meter system can be used with other absorption dynamometers, the preferred absorption dynamometer 10 is shown in FIGS. 1 through 3. An alternate absorption dynamometer is described in U.S. Pat. No. 4,744,724. The absorption dynamometer 10 comprises a structure 12 in which a bladed rotor 14 is bolted to a pair of stub shafts 16. One end of each stub shaft 16 has a flange 15. The rotor is attached to the shaft 16 by a plurality of bolts 19 passing through the flanges 15 and the rotor 14. One end of one shaft 16 has a coupling 18 for attachment to the torque measurement system 58.

The structure 12 is open at opposite axial ends 20 and 22 to provide for admittance of fluid from both ends. Centrally of the structure 12, within each end, are shaft support housings 24 (only one is shown) which are integral with three, equidistant struts 26 (only one is shown). The struts 26 bridge, radially, between the housings 24 and the inside, circumferential surface of the ends 20, 22 of the structure 12. The rotor 14 has a body 28, and about the periphery of each side thereof is a series of arcuate blades 30, the blades being interposed in the radial exit flow paths for the fluid admitted from the ends 20, 22.

Blades 30 are defined of convex and concave surfaces 32 and 34 which terminate at, and join, in lateral edges 36 and 38. Each blade 30 has a greatest thickness "T" common to all blades 30. The edges 36, 38 of any blade 30 occur on a radial line "R" drawn from the axial center of the rotor 14. The circumferential distance "c/d" obtaining between a given radial line "R", and a blade 30 most adjacent thereto, is less than said thickness "T". Between blades 30, there exists an arcuate channel 40 for fluid having a width which is greater than said thickness "T".

The structure 12 carries a pair of annular shrouds 42 and 44 which are selectively engageable with and disengageable from the blades 30 for occluding and exposing more or less of the blade lengths to the radial exit flow paths for the fluid. Each annular shroud 42 and 44 is coupled to a ball nut 46 which is engaged with a ball screw 48. The latter terminates in a sprocket 50 which is engaged with and driven by a roller chain 52. There are three, circumferentially spaced apart ball nut, screw and sprocket arrangements on each side of the dynamometer 10, and each side has a separate drive chain 52. However, the threading of the ball screw 48 on one side of the dynamometer 10 is of the opposite hand of the other. Hence, upon the roller drive chains 52 being turned in a common direction, the shrouds 42, 44 on either sides will advance upon the rotor blades 30 in common, or withdraw therefrom in common. In order to drive the roller chains 52 in common, the latter are coupled to drive sprockets 54 mounted on a shroud control shaft 56. The latter is driven, selectively, by means not shown. The shrouds 42, 44 do not contact the blades 30.

Axial blades 30 are arranged on either side of the body 28 of the rotor 14 oriented in a radial aerodynamic flow path. As shown, the rotor 14 is rotatably supported between the housings 24 and the arcuate sides of the rotor turn the admitted axially flowing fluid to radial flows. The blades 30, then, are interposed in the radially-exiting fluid flow paths. This configuration of rotor blading 30 permits the variation of the effective length of the blades 30 in the dynamometer 10 and, thus, the power absorbed may be varied, with the speed held constant.

The torque measurement system 58 is shown attached to coupling 18 on one end of shaft 16. A torque sensor housing 60 is attached to one of the shaft support housings 24 and extends axially away from the shaft support housing 24. A connecting flange 62 is attached to torque shaft 70. The engine to be tested is attached to the connecting flange 62. The torque measurement system 58 is designed to be compact, such that the majority of the torque measurement system 58 remains within the original envelop of the absorption dynamometer 10.

As shown in FIG. 4, the torque measurement system 58 is enclosed in the torque sensor housing 60. Attached to the free end of the housing 60 is a bearing housing 72. A pair of angular contact bearings 74 are mounted in the bearing housing 72. The bearings 74 are separated by a spacer 76 positioned between the bearings 74. A wave spring 80 and an "L" shaped spring support 78 are located adjacent each angular contact bearing 74. The wave springs 80 preload the angular contact bearings 74. A spacer 79 and snap ring 81 are axially positioned adjacent the wave spring 80 and spring support 78. The spacers 79 and snap rings 81 transmit the spring force of the wave springs 80 to the bearing housing 72. A small clearance 82 is provided to accommodate axial movement of the torque shaft 70. The clearance 82 is between the spring support 78 and the spacer 79. Each clearance 82 is approximately 0.02 inches. Axial movement of the torque shaft 70 is limited by the spacers 79 and snap rings 81.

The torque shaft 70 is supported on the outboard end by the angular contact bearings 74. The inboard end of the torque shaft 70 is connected by a coupling 86 to splined coupling 18 provided on the end of shaft 16. The inboard end 84 of the torque shaft 70 is permitted to slide axially relative to the coupling 86. The torque shaft 70 and the coupling 86 are also splined. In the event the engine connected to the dynamometer 10 and torque measurement system 58 moves axially relative to the dynamometer 10, the clearances 82 permit the torque shaft 70 to move axially relative to the coupling 86 and the dynamometer 10, thus axially movement of the engine is taken up by the torque measurement system 58 and is not transmitted to the dynamometer 10.

Figure 5:
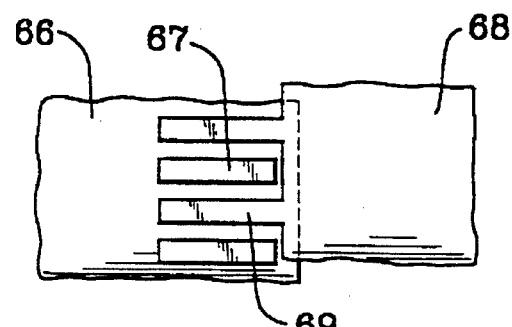
FIG. 5 is a partial plan view showing the intermeshing teeth of the torque measurement system of FIG. 4.
Figure 8:
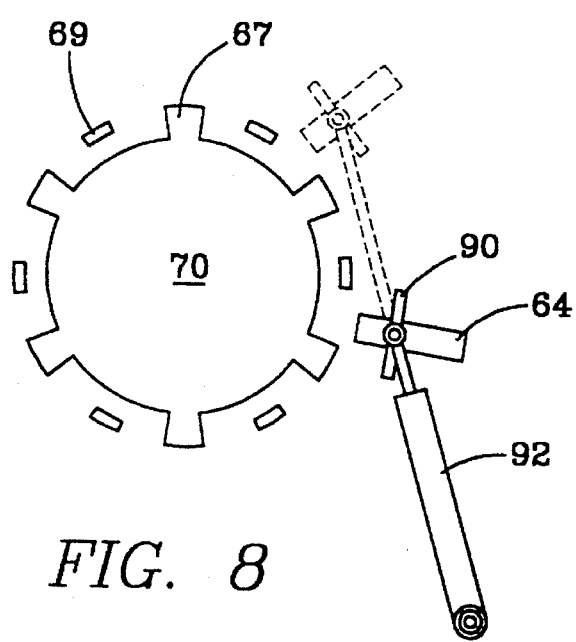
FIG. 8 is a schematic end view of the torque measuring device of the present invention at 0% torque.
Figure 9:
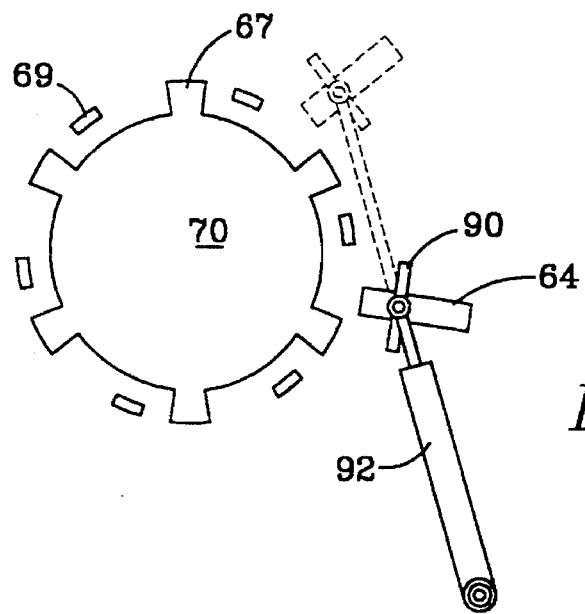
FIG. 9 is a schematic end view of the torque measuring device of the present invention at 100% torque.

Two toothed cylindrical sleeves 66, 68 are attached to the torque shaft 70. The sleeves 66, 68 are attached to opposite ends of the torque shaft 70. Interleaving teeth 67, 69 extend from each sleeve 66, 68. One sleeve 66 has a smaller diameter than the other sleeve 68. As shown in FIGS. 4 and 5, the teeth 67 extend radially from sleeve 66. Teeth 69 extend axially from sleeve 68. The teeth 67, 69 interleave as shown in FIG. 5. A single sensor 64 is positioned proximate the interleaving teeth 67, 69. The sensor 64 is movably mounted by bracket 90a to the torque sensor housing 60. This permits the sensor to be moved from a first position to a second position as shown in FIGS. 8 and 9. Although FIG. 4 shows the sensor 64 being movably mounted to the torque sensor housing 60, in operation, the sensor 64 may be fixedly attached to the housing 60. For this alternate mounting, the sensor 60 must be removed and attached to a separate device, such as a linearly variable differential transmitter (LVDT) 92, as shown in FIGS. 8 and 9. The preferred sensor 64 is an optical sensor using a magneto-optic film. Other sensor types such as a variable reluctance sensor may be used. This sensor 64 detects the phase shift between the teeth 67, 69. The phase shift is proportional to the torque transmitted by torque shaft 70. The interleaved teeth 67, 69 are equally spaced from one another, as shown in FIG. 8, at zero torque. As the torque increases, one set of teeth approaches the other, such that the teeth 67, 69 are offset, as shown in FIG. 9, at full torque.

Figure 6:
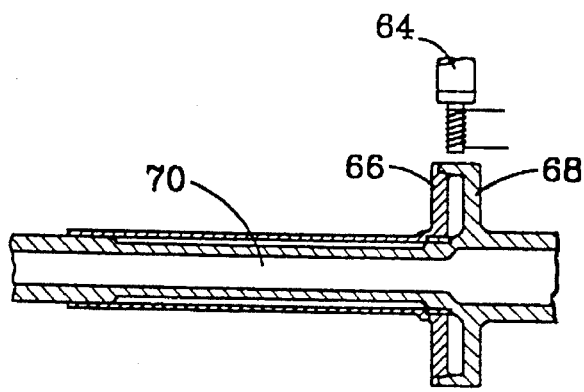
FIG. 6 is a schematic side view of a torque shaft and torque sensor.
Figure 6A:
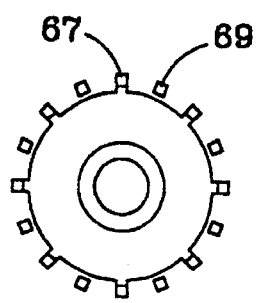
FIG. 6A is a schematic end view of the torque shaft and torque sensor shown in FIG. 6.
Figure 7A:
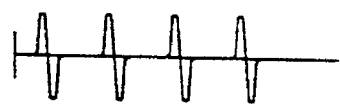
FIGS. 7A and 7B are graphs showing representative torque sensor output signal at 0% torque and 100% torque respectively.
Figure 7B:
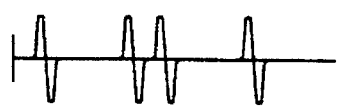

FIGS. 6 and 6A show a schematic representation of the torque measuring system. Representative torque sensor 64 output waveforms at 0% and 100% torque are shown in FIGS. 7A and 7B, respectively.

The active part of the optical torque sensor 64 is a magneto-optic film. The magneto-optic film acts as a metamorphic phase grating when subjected to a changing magnetic field. Without a magnetic field, a random domain structure prevails. This random grating diffracts the transmitted light into concentric cones. In the presence of a strong magnetic field, the random phase grating metamorphoses into a stripe domain grating. This stripe grating allows the transmitted light to pass through virtually undiffracted. The magneto-optic film and sensor is described in U.S. Pat. No. 4,947,035, Fiber Optic Transducer Using the Faraday Effect.

A light source and optical fibers provide a source of light to the optical torque sensor 64. The interleaved teeth 67, 69 rotate adjacent the sensor 64 and modulate the magnetic field within the sensor. The modulated magnetic field in the sensor 64 causes the phase grating of the magneto-optic film to change. The changing phase grating diffracts the light source. If a ferro-magnetic tooth is not present, the light is diffracted out of the optical path and is absorbed. If a ferro-magnetic tooth is present, then the magneto-optic film is nominally at saturation and the light is not diffracted out of the optical path.

The present invention has the unique ability to generate torque information in the absence of any rotational movement of the torque shaft, thus allowing a static calibration check of the torque sensing system.

The torque shaft assembly 70 is pinned in a fixed position such that an assigned set of teeth (one torque tooth 67 and one reference tooth 69) may be interrogated by the optical sensor 64. The optical sensor 64 is mounted on a holding bracket 90 which allows the sensor tip 64a to swing in an arc, concentric with the center of the torque shaft assembly 70, over the assigned tooth pair at the appropriate air gap. The bracket 90 may be removed and the sensor 64 remounted to a second static bracket for operational dynamic testing. An LVDT 92 links the moveable bracket 90 to an anchoring point and provides linear displacement data to a processor which in turn converts the linear displacement data into angular displacement data.

Figure 8A:
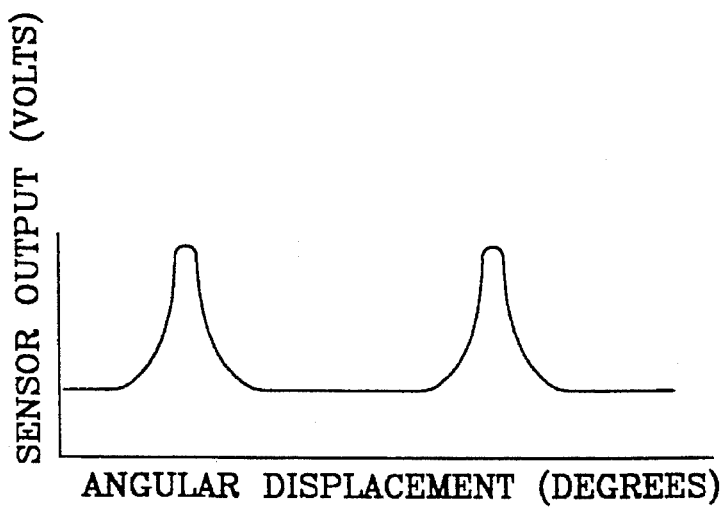
FIG. 8A is a graph of the torque sensor (shown in FIG. 8) output signal.
Figure 9A:
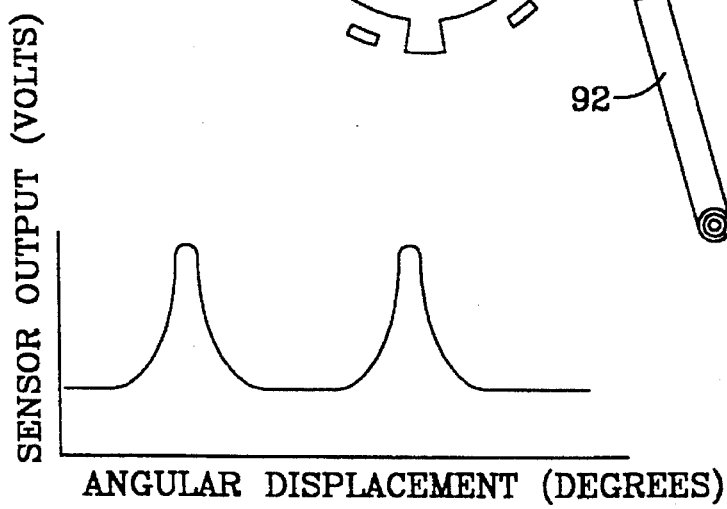
FIG. 9A is a graph of the torque sensor (shown in FIG. 9) output signal.

To perform a static (or zero speed) calibration check, the torque shaft assembly 70 is pinned in position in an unloaded, zero torque condition. The optical torque sensor 64 is moved over the assigned pair of teeth 67, 69 by moving the holding bracket 90 either manually or automatically. As the sensor 64 passes over the two teeth 67, 69, two signals are generated, optical sensor output and angular displacement, as shown in FIG. 8A. Utilizing these signals, the angular displacement between the teeth is determined. Then the torque in the torsion shaft is calculated using the properties of the torsion shaft and the distance between the teeth, i.e., the angular displacement. In the unloaded case, this calculated torque should be zero, within the tolerance of the torque measuring system. A zero torque verification ensures that the shaft 70 has not been stressed beyond its yield point and that the zero offset setting has been maintained. With the addition of a moment arm (not shown) with suspended weights to the end of the torque shaft assembly, the calibration check may be repeated at 100% torque or any other desired torque value. FIGS. 9 and 9A illustrate the relative phase change at 100% torque.

The present invention incorporates the following advantages:

The torque meter develops the required twist in a very short shaft. There is minimal increase in the envelope of the dynamometer.

The torque meter absorbs axial movement of the engine shaft, isolating the dynamometer from such movement.

The critical speed of the torque meter is above the operating range of the dynamometer.

The torque meter is supported by high-performance grease-packed bearings, completely independent of the bearings and lubrication system of the dynamometer itself.

Having described the invention, what is claimed is:

1. A method for calibrating an absorption dynamometer, the absorption dynamometer having a torque sensing system, the torque sensing system including a torsion shaft, at least one first tooth projecting from a first location on the torsion shaft, at least one second tooth projecting from a second location on the torsion shaft, the first location being distal to the second location, the at least one first tooth being proximate the at least one second tooth whereby the teeth interleave, the angular distance between the at least one first tooth and the at least one second tooth varying as the torque in the torsion shaft changes, and a sensor positioned proximate the interleaved teeth, the method for calibrating comprising the steps:

keeping the torsion shaft secured to the absorption dynamometer;

securing the torsion shaft in a fixed position;

loading the torsion shaft to a predetermined torque;

moving the sensor past at least two interleaved teeth, the sensor producing an output signal representative of the position of the at least two interleaved teeth, the distance between the interleaved teeth being representative of the torque in the torsion shaft.

2. The method according to claim 1, further comprising:

calculating the torque in the torsion shaft using the properties of the torsion shaft and the distance between the interleaved teeth.

3. The method according to claim 2, further comprising:

comparing the calculated torque to the predetermined torque.

4. The method according to claim 1, further comprising:

removing any Load on the torsion shaft such that the torsion shaft is loaded to zero torque;

moving a sensor past at least two interleaved teeth, the sensor producing an output signal representative of the position of the at least two teeth, the distance between the interleaved teeth being representative of the torque in the torsion shaft.

5. The method according to claim 4, further comprising:

calculating the torque in the torsion shaft using the properties of the torsion shaft and the distance between the interleaved teeth.

6. The method according to claim 5, further comprising:

comparing the calculated torque to zero torque.

7. A method for calibrating an absorption dynamometer, the absorption dynamometer having a torque sensing system, the torque sensing system including a torsion shaft, at least one first tooth projecting from a first location on the torsion shaft, at least one second tooth projecting from a second location on the torsion shaft, the first location being distal to the second location, the at least one first tooth being proximate the at least one second tooth whereby the teeth interleave, the angular distance between the at least one first tooth and the at least one second tooth varying as the torque in the torsion shaft changes, and a sensor positioned proximate the interleaved teeth, the method for calibrating comprising the steps:

keeping the torsion shaft secured to the absorption dynamometer;

securing the torsion shaft in a fixed position;

loading the torsion shaft to a predetermined torque;

moving the sensor past at least two interleaved teeth, the sensor producing an output signal representative of the position of the at least two interleaved teeth, the distance between the interleaved teeth being representative of the torque in the torsion shaft;

calculating a first torque in the torsion shaft using the properties of the torsion shaft and the distance between the interleaved teeth;

comparing the calculated first torque to the predetermined torque;

removing any load on the torsion shaft such that the torsion shaft is loaded to zero torque;

moving a sensor past at least two interleaved teeth, the sensor producing an output signal representative of the position of the at least two teeth, the distance between the interleaved teeth being representative of the torque in the torsion shaft;

calculating a second torque in the torsion shaft using the properties of the torsion shaft and the distance between the interleaved teeth; and comparing the calculated second torque to zero torque.

\* \* \* \* \*